United States Patent
Tsukamoto et al.

(10) Patent No.: US 7,111,506 B2
(45) Date of Patent: Sep. 26, 2006

(54) MALFUNCTION DETECTING SYSTEM OF ENGINE COOLING APPARATUS

(75) Inventors: Toshinori Tsukamoto, Wako (JP); Eisaku Gosyo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/790,679

(22) Filed: Mar. 3, 2004

(65) Prior Publication Data
US 2004/0173012 A1    Sep. 9, 2004

(30) Foreign Application Priority Data
Mar. 6, 2003    (JP) ............................ 2003-059535

(51) Int. Cl.
*G01M 15/00* (2006.01)
(52) U.S. Cl. .................................................. 73/118.1
(58) Field of Classification Search .................. 73/116, 73/117.2, 117.3, 118.1, 119 R
See application file for complete search history.

(56) References Cited

U.S. PATENT DOCUMENTS

| | | | |
|---|---|---|---|
| 6,279,390 B1 * | 8/2001 | Oka et al. .................... | 73/118.1 |
| 6,725,710 B1 * | 4/2004 | Oka et al. .................... | 73/118.1 |
| 6,804,588 B1 * | 10/2004 | Oki et al. .................... | 701/129 |
| 2002/0088274 A1 * | 7/2002 | Oka et al. .................... | 73/118.1 |
| 2003/0131659 A1 * | 7/2003 | Oka et al. .................... | 73/118.1 |
| 2004/0168510 A1 * | 9/2004 | Wakahara et al. .......... | 73/118.1 |
| 2005/0097946 A1 * | 5/2005 | Wakahara et al. .......... | 73/118.1 |

FOREIGN PATENT DOCUMENTS

| | | |
|---|---|---|
| JP | 10-176534 | 6/1998 |
| JP | 2000-8853 | 1/2000 |
| JP | 2001-073773 | 3/2001 |

* cited by examiner

*Primary Examiner*—Eric S. McCall
(74) *Attorney, Agent, or Firm*—Arent Fox PLLC

(57) ABSTRACT

In a malfunction detecting system of an engine cooling apparatus constituted as a radiator having a thermostat opening/closing an inlet pipe and an outlet pipe, a temperature sensor is installed at the radiator to detect a temperature of the coolant flowing through the radiator. In the system, a period of time since the engine starting is measured and is compared with a predetermined value indicative of a period of time until the thermostat presumably opens. Then, the detected coolant temperature is compared with three reference values, when the measured period of time exceeds the predetermined value and it is discriminated that the cooling apparatus, more specifically, the thermostat of the radiator has malfunctioned, when the coolant temperature exceeds a medium one of the reference values. In addition, it is discriminated the apparatus has malfunctioned, if the coolant temperature exceeds the highest reference value, even when the measured period of time does not exceed the predetermined value. Further, the discrimination is reserved, if the coolant temperature exceeds the lowest reference value, but the coolant temperature does not exceed the highest reference value, while it is discriminated that the apparatus is normal, if the coolant temperature does not exceed the lowest reference value. With this, by directly detecting radiator coolant temperature, the malfunction can be detected with high accuracy.

13 Claims, 6 Drawing Sheets

FIG. 5

| INITIAL RADIATOR COOLANT TEMP. TR | -10 | 0 | 10 | 20 | 30 | 40 | 50 |
|---|---|---|---|---|---|---|---|
| INITIAL RADIATOR COOLANT TEMP. CORRECTION VALUE (sec) | 230 | 160 | 120 | 80 | 45 | 20 | 0 |

FIG. 6

| ENGINE LOAD | 0 | 2 | 4 | 8 | 12 |
|---|---|---|---|---|---|
| ENGINE LOAD CORRECTION COEFFICIENT | 3.0 | 2.0 | 1.4 | 1.0 | 0.8 |

FIG. 7

| VEHICLE SPEED VPS | 0 | 10 | 20 | 40 | 60 | 80 | 100 | 120 |
|---|---|---|---|---|---|---|---|---|
| VEHICLE SPEED CORRECTION COEFFICIENT | 0.94 | 0.94 | 0.95 | 0.97 | 1.0 | 1.04 | 1.1 | 1.2 |

MALFUNCTION DETECTING SYSTEM OF ENGINE COOLING APPARATUS

BACKGROUND OF THE INVENTION

1. Field of the Invention

This invention relates to a malfunction detecting system of an engine cooling apparatus, more particularly to a malfunction detecting system of a radiator, still more particularly to a malfunction detecting system of a radiator thermostat.

2. Description of the Related Art

The internal combustion engine of a vehicle is equipped with a radiator (cooling apparatus) for cooling a coolant. The radiator is connected midway of a coolant communicating passage composed of an inlet pipe and an outlet pipe. A thermostat (shut-off valve) is installed in the communicating passage. The thermostat closes the communicating passage when the coolant temperature is low, such as just after engine starting, and opens it as the coolant temperature rises so that the coolant can enter the radiator to be cooled.

Since the radiator is one of the on-board components of a vehicle, it is preferably checked for malfunction. It was for this purpose that the assignee developed a system that first checks whether the engine is in a state cooled to a temperature equal to the outside air temperature (intake air temperature) owing to thorough soaking (long-period or sufficient standing) and whether change in the outside air temperature since engine starting is small, and then, when these conditions are met, determines that the conditions for execution of malfunction detection have been established, whereafter it carries out a calculation for estimating the coolant temperature and determines that the radiator, more precisely the radiator thermostat, has malfunctioned if, for example, the detected coolant temperature has not reached the judge-normal value when the estimated coolant temperature reaches the judge-malfunction value. This technology is described in the assignee's Japanese Laid-Open Patent Application 2000-008853.

SUMMARY OF THE INVENTION

As this system relies on an estimated coolant temperature for detecting malfunction, however, its accuracy compares unfavorably with a system that discriminates malfunction based on directly detected radiator coolant temperature.

An object of this invention is therefore to overcome the foregoing drawback by providing a malfunction detecting system of an engine cooling apparatus that by directly detecting radiator coolant temperature can detect malfunction of an engine cooling apparatus, more specifically a radiator, still more specifically a thermostat with high accuracy.

In order to achieve the object, the invention provides in its first aspect, a system for detecting malfunction of an engine cooling apparatus constituted as a radiator having an inlet pipe and an outlet pipe each connected to an internal combustion engine in such a manner that coolant flows in the radiator through the inlet pipe to be cooled and is then recirculated back to the engine through the outlet pipe, and a thermostat opening/closing the inlet pipe and the outlet pipe, comprising: a temperature sensor installed at the radiator and detecting a temperature of the coolant flowing through at least one of the inlet pipe and outlet pipe; malfunction discrimination area determining means for determining whether operation of the engine since starting is within an area that enables malfunction discrimination of the cooling apparatus; and malfunction discriminating means for discriminating whether the cooling apparatus has malfunctioned based on change of the temperature of the coolant since the engine starting, when the operation of the engine is discriminated to be within the malfunction discrimination area.

In order to achieve the object, the invention provides in its second aspect, a system for detecting malfunction of an engine cooling apparatus constituted as a radiator having an inlet pipe and an outlet pipe each connected to an internal combustion engine in such a manner that coolant flows in the radiator through the inlet pipe to be cooled and is then recirculated back to the engine through the outlet pipe, and a thermostat opening/closing the inlet pipe and the outlet pipe, comprising: a temperature sensor installed at the radiator and detecting a temperature of the coolant flowing through at least one of the inlet pipe and outlet pipe; time measuring means for measuring a period of time since the engine starting; time comparing means for comparing the measured period of time with a predetermined value indicative of a period of time until the thermostat presumably opens after the engine starting; temperature comparing means for comparing the temperature of the coolant with a reference value, when the measured period of time exceeds the predetermined value; and malfunction discriminating means for discriminating that the cooling apparatus has malfunctioned, when the temperature of the coolant exceeds the reference value.

BRIEF DESCRIPTION OF THE DRAWINGS

The above and other objects and advantages of the invention will be more apparent from the following description and drawings, in which:

FIG. 5 is a table showing the characteristic of an initial radiator coolant temperature correction value used in the processing to calculate a predetermined time period in the flow chart of FIG. 3;

FIG. 6 is a table showing the characteristic of an engine load correction coefficient used in the processing to calculate the predetermined time period in the flow chart of FIG. 3;

FIG. 7 is a table showing the characteristic of a vehicle speed correction coefficient used in the processing to calculate the predetermined time period in the flow chart of FIG. 3;

DETAILED DESCRIPTION OF THE PREFERRED EMBODIMENT

An embodiment of the invention will now be explained with reference to the attached drawings.

Figure 1:
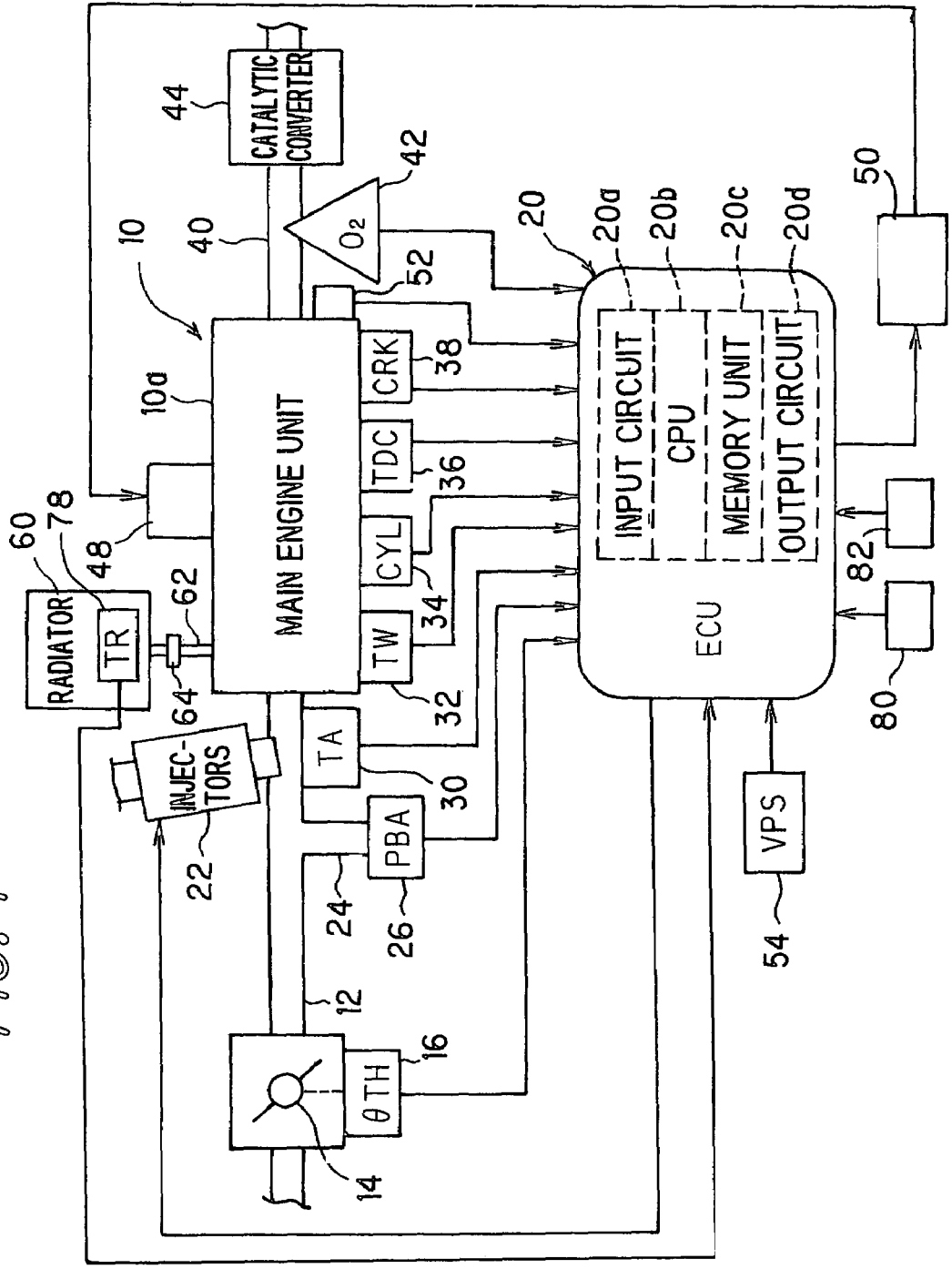
FIG. 1 is a schematic overview of a malfunction detecting system of an engine cooling apparatus (radiator) according to an embodiment of the present invention.

FIG. 1 is a schematic overview of a malfunction detecting of an engine cooling apparatus (radiator) according to the embodiment of the present invention.

Reference numeral 10 in FIG. 1 designates a four-cylinder, four-cycle internal combustion engine. An air intake pipe 12 equipped with a throttle valve 14 is connected to a main engine unit 10a of the engine 10. A throttle position sensor 16 coupled with the throttle valve 14 produces and sends to an Electronic. Control Unit (ECU) 20 an electric signal representing the opening or position θTH of the throttle valve 14. Downstream of the throttle valve, the air intake pipe 12 forms an intake manifold (not shown). For each cylinder, a fuel injector 22 is provided in the intake manifold at a point upstream of an intake valve (not shown) of the cylinder. The injectors 22 are physically connected to a fuel pump (not shown) that supplies them with pressurized fuel and are electrically connected to the ECU 20. The ECU 20 controls the valve open time of the injectors 22 and each injector 22 injects (supplies) pressurized fuel to the region of the intake valves while open.

A manifold absolute pressure sensor 26 connected with the air intake pipe 12 through a branch pipe 24 downstream of the throttle valve 14 produces an electric signal representing the manifold absolute pressure PBA in the air intake pipe 12 (indicative of engine load). An outside air temperature (intake air temperature) sensor 30 attached to the air intake pipe 12 downstream of the manifold absolute pressure sensor 26 outputs an electric signal representing the intake air temperature TA. A coolant temperature sensor 32 installed near a coolant passage (not shown) of the main engine unit 10a outputs an electric signal representing the engine coolant temperature TW.

A cylinder discrimination sensor 34 installed near the camshaft or crankshaft (neither shown) of the engine 10 outputs a cylinder discrimination signal CYL every time the piston of a certain cylinder reaches a prescribed position. A TDC (Top Dead Center) sensor 36 installed near the camshaft or crankshaft (neither shown) outputs a TDC signal pulse once every crankangle (e.g., BTDC 10 degrees) associated with the TDC position of the piston (not shown) of each cylinder. A similarly installed crankangle sensor 38 outputs CRK pulse signals at a shorter crankangle period (e.g., every 30 degrees) than the period of the TDC pulse signals.

In the exhaust system of the engine 10, an air/fuel ratio ($O_2$) sensor 42 is installed at an appropriate portion of an exhaust pipe 40 connected to the exhaust manifold (not shown). The air/fuel ratio sensor 42 outputs a signal representing the oxygen concentration $O_2$ of the exhaust gas. A three-way catalytic converter 44 provided downstream of the air/fuel ratio sensor 42 removes HC, CO and NOx components from the exhaust gas.

Spark plugs 48 associated with the respective combustion chambers (not shown) of the engine 10 are electrically connected to the ECU 20 through an ignition coil and ignitor (collectively designated by reference numeral 50). A knock sensor 52 mounted on the cylinder head (not shown) of the main engine unit 10a outputs a signal representing vibration of the engine 10. Further, a vehicle speed sensor 54 mounted in the vicinity of the drive shaft (not shown) of the vehicle powered by the engine 10 outputs a pulse once every unit rotation of the vehicle wheels.

The outputs of these sensors are sent to the ECU 20. The ECU 20, which is constituted as a microcomputer, comprises an input circuit 20a for receiving input signals from the aforesaid sensors and subjecting them to wave shaping, conversion to a prescribed voltage level and conversion from analog to digital form, a CPU (Central Processing Unit) 20b for conducting logical operations, a memory unit 20c for storing processing programs executed by the CPU, processed data and the like, and an output circuit 20d. The output of the knock sensor 52 is sent to a detection circuit (not shown) in the ECU 20, where it is compared with a knock discrimination level obtained by amplifying the noise level (calculated by averaging the sensor outputs). The CPU 20b uses the output of the detection circuit to discriminate whether knock occurs in the combustion chambers. The CPU 20b also calculates the engine speed NE from the counted number of CRK signal pulses and calculates the vehicle speed VPS from the counted number of output pulses by the vehicle speed sensor 54.

The CPU 20b also retrieves a basic ignition timing from predefined mapped data stored in the memory unit 20c using the detected engine speed NE and the manifold absolute pressure PBA (an engine load parameter) as address data, adjusts the basic ignition timing based on the engine coolant temperature TW etc., and further retards the basic ignition timing if engine knock has been detected. The CPU 20b also determines the fuel injection quantity in terms of injector open time and drives the injectors 22 through the output circuit 20d and a drive circuit (not shown).

A radiator (cooling apparatus) 60 is connected to the engine 10.

Figure 2:
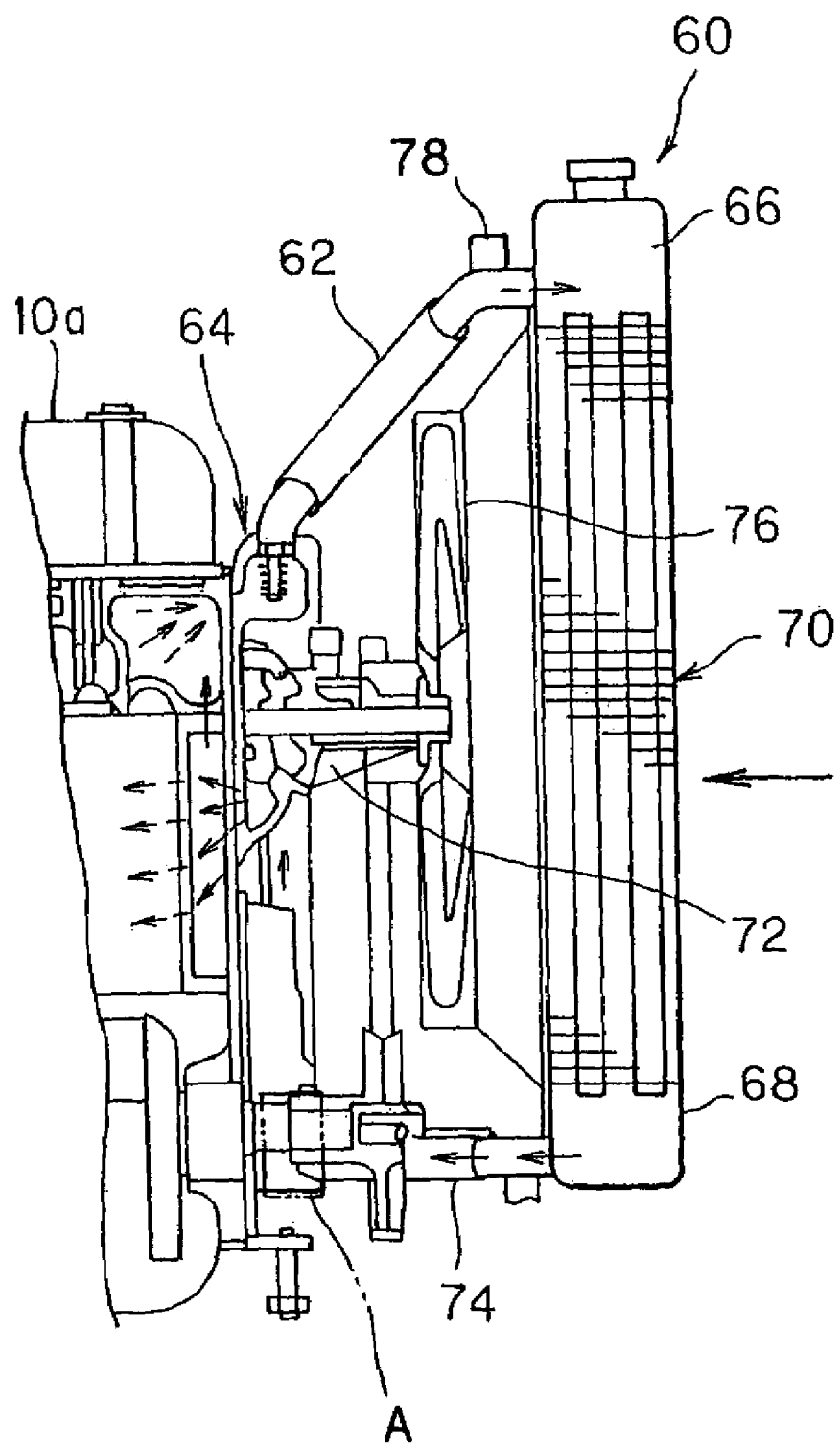
FIG. 2 is an explanatory side sectional view showing the details of a radiator illustrated in FIG. 1.

FIG. 2 is an explanatory side sectional view showing the details of the radiator 60.

As illustrated, the radiator 60 is connected to the engine main unit 10a through an inlet pipe (communicating passage) 62. A thermostat 64 is fitted in the inlet pipe 62. The radiator 60 has an upper tank 66 at the top, a lower tank 68 at the bottom, and a honeycomb core 70 accommodated in the intervening space. The inlet pipe 62 is connected to the upper tank 66 and an outlet pipe 74 is connected to the lower tank 68. A water pump 72 pressurizes coolant in the coolant passage of the engine unit 10a so as to circulate it through the inlet pipe 62, the upper tank 66, the core 70, the outlet pipe 74 and back to the coolant passage of the engine unit 10a. Although not illustrated, a branch pipe for supplying hot coolant to the core of a passenger compartment heater is led off from the inlet pipe 62 or a point upstream thereof. As indicated by an arrow in FIG. 2, the core 70 is cooled by air flowing in from the direction opposite to the direction of vehicle travel. A forced flow of cooling air is further produced by a fan 76 located behind the radiator and driven by the engine.

The thermostat 64 is a shut-off valve operated by a bimetallic strip. At engine starting, when the coolant temperature is low, the thermostat 64 closes the inlet pipe 62 to prevent coolant from flowing into the radiator 60. Then, as the coolant temperature rises, it progressively opens the inlet pipe 62 so that the coolant flows in contact with the core 70 to be cooled and is then returned to the engine coolant passage.

A temperature sensor 78 installed at an appropriate location on the radiator side of the inlet pipe 62 downstream of the thermostat 64 outputs an electric (detection) signal representing the temperature of the coolant flowing through at least one of the inlet pipe 62 and outlet pipe 74 (more specifically, the inlet pipe 62 in the illustrated configuration). This temperature will be referred to as the "radiator coolant temperature TR."

A heater switch 80 and an air-conditioner switch 82 (see FIG. 1) are connected with a manipulation lever (located near the operator's seat; not shown) of the passenger compartment heater (not shown) and an air conditioner (not shown) for cooling the passenger compartment. The heater switch 80 and air-conditioner switch 82 are responsive to manipulation of the lever by the operator for outputting signals for turning the heater and air conditioner on and off. The outputs of the temperature sensor 78, heater switch 80 and air-conditioner switch 82 are sent to the ECU 20.

As explained further later, in the foregoing arrangement, the ECU 20 uses the outputs of the temperature sensor 78 and the like to detect malfunction of the radiator (cooling apparatus) 60, more specifically malfunction of the thermostat 64, still more specifically open-state sticking of the thermostat 64.

The mode of operation of the malfunction detecting system according to this embodiment will now be explained with reference to the flow chart of FIG. 3. The illustrated program is executed at regular intervals of, for example, 2 sec.

In S10, a timer (time counter) T is incremented to clock time passed from engine starting. Next, in S12, various parameters indicating engine operating conditions and the like are read. Specifically, the engine operating conditions etc. are detected, whereafter a value Tref (predetermined time) is calculated in S14.

Figure 4:
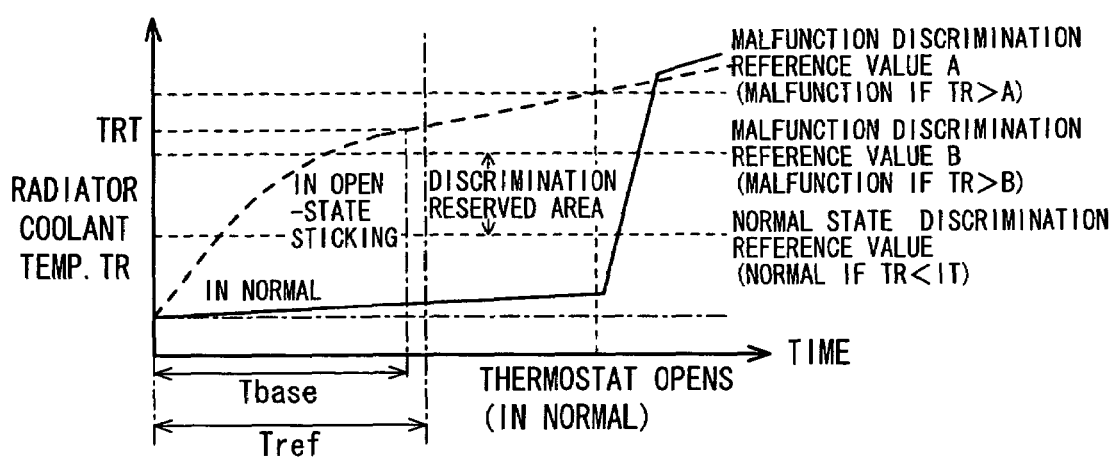
FIG. 4 is a time chart explaining the operation illustrated in the flow chart of FIG. 3.

The explanation will be continued with reference to FIG. 4. When the thermostat 64 of the radiator 60 is operating normally, the thermostat 64 remains closed to keep the inlet pipe 62 blocked from the time that the engine 10 starts to the time it warms up. Since the coolant present in the radiator 60 is therefore confined to circulation inside the radiator 60, the radiator coolant temperature TR stays at a low temperature as indicated by the solid line curve in FIG. 4.

Then, as the engine 10 warms up and the engine coolant temperature TW increases to a certain level, the thermostat 64 opens to let the engine coolant flow into the radiator 60 through the inlet pipe 62 and be cooled while circulating therein. The resulting cooled radiator coolant flows into the engine 10 through the outlet pipe 74 to serve as engine coolant for cooling the engine 10.

If the thermostat 64 should malfunction, specifically if it should experience open-state sticking, the engine coolant will flow into the inlet pipe 62 from immediately after engine starting so that, as shown by the broken line curve in FIG. 4, the radiator coolant temperature TR will begin to rise from immediately after starting and continue rising over the course of time. In other words, it will rise in proportion as the engine coolant temperature TW rises.

Thus, the temperature rise characteristic (pattern) of the radiator coolant temperature TR differs between normal and abnormal operation of the thermostat 64. In the system according to this embodiment, therefore, the temperature sensor 78 is installed downstream of the thermostat 64 (at a location where it can detect the temperature of the coolant flowing in the piping between the thermostat 64 and the outlet of the radiator 60) to detect the radiator coolant temperature TR at this point and malfunction of the cooling apparatus (radiator) 60, more specifically open-state sticking of the thermostat 64, is detected by comparing the detected radiator coolant temperature TR with a reference value.

Tref is a prescribed time period extending from just after engine starting to just before opening of the thermostat 64 (i.e., a value indicative of a period of time until the thermostat presumably opens after the engine starting) and is defined as the period of time required to pass before the temperature rise pattern of the radiator coolant temperature TR when the thermostat 64 is normal and can be clearly distinguished from that when it is not normal (has malfunctioned).

Value Tref is calculated as:

$$Tref = (\text{Base value } Tbase + \text{Initial radiator coolant temperature correction value}) \times \text{Engine load correction coefficient} \times \text{Vehicle speed correction coefficient}$$

The various parameters needed to calculate Tref are therefore read in S12 and the value of Tref is calculated in S14, as will now be explained.

Tbase is calculated as follows. First, experimentation is conducted in advance to determine or ascertain a target temperature sufficient for distinguishing between the open-state sticking and normal states in an average operating condition (running condition), i.e., in a condition where the engine 10 is under medium load and the vehicle speed VPS is 60 km/h. The time required to reach this temperature after engine starting is then similarly detected and defined as Tref. The target temperature (TRT) and the base value Tbase are shown in FIG. 4. The target temperature TRT is subject to the limitation that it must be lower than a malfunction discrimination reference value A discussed later.

The "Initial radiator coolant temperature correction value" is a correction value set in accordance with the initial (engine start time) radiator coolant temperature TR. Specifically, experimentally ascertained values are tabulated as shown in FIG. 5 and the "Initial radiator coolant temperature correction value" is retrieved from the table data using the detected radiator coolant temperature TR. Values not appearing in the table are calculated by linear interpolation. When the engine 10 is not operating and is in a totally cooled state after prolonged soaking, the engine coolant temperature TW can be used in place of the radiator coolant temperature TR. As shown in FIG. 5, the "Initial radiator coolant temperature correction value" increases with decreasing radiator coolant temperature TR.

The "Engine load correction coefficient" is a coefficient based on the load of the engine 10, specifically, the quantity of fuel injection supplied to the engine 10. The engine load is calculated first as:

$$\text{Engine load} = \text{Fuel injection time} \times \text{Detected engine speed NE/Reference engine speed}$$

The "Reference engine speed" is the idling speed (e.g., 700 rpm). The "Fuel injection time" corresponds to the aforesaid fuel injection quantity (injector open time).

The "Engine load correction coefficient" is a coefficient (absolute number) acquired by converting the value calculated using the above equation in accordance with an appropriate characteristic. It can be retrieved from table data prepared from data experimentally acquired in advance, like the ones shown in FIG. 6. Values not appearing in the table are calculated by linear interpolation.

The "Engine load correction coefficient" is assigned a reference value (1.0, i.e., no correction) for an engine load of 8 (medium load) and, as shown in FIG. 6, is assigned higher (lower) values as the engine load falls below (rises above) medium load. This is because at higher load the time that needs to pass becomes shorter owing to increase in generated heat. In other words, less time is required before the pattern of temperature rise becomes clear. The engine load of zero indicated in FIG. 6 occurs at the time of a fuel cutoff (stoppage of fuel supply). Since the amount of generated heat is zero or very small during fuel cutoff, the "Engine load correction coefficient" is set to a value that increases the time period.

The "Vehicle speed correction coefficient" is a correction coefficient set based on the detected vehicle speed VPS. It is also retrieved from table data prepared from data experimentally acquired in advance, like the one shown in FIG. 7, using the average value of the detected vehicle speed VPS. Values not appearing in the table are calculated by linear interpolation.

The "Vehicle speed correction coefficient" is assigned a reference value (1.0, i.e., no correction) for a vehicle speed VPS of 60 km/h and, as shown in FIG. 7, is assigned lower (higher) values as the vehicle speed increases (decreases). This is because wind cooling owing to speed-induced airflow increases (decreases) with increasing (decreasing) vehicle speed, so that the time required to reach the target temperature TRT in FIG. 4 becomes longer (shorter). The reason for using the average value of the vehicle speed VPS is to minimize the influence of transient states such as abrupt acceleration or abrupt deceleration. The vehicle speed average value can be obtained either by averaging a prescribed number of sampled vehicle speeds. Similar purpose can be achieved by directly averaging coefficients retrieved by detected vehicle speeds.

A correction coefficient corresponding to the operating condition of the passenger compartment heater can be further included in the equation for calculating Tref.

Figure 8:
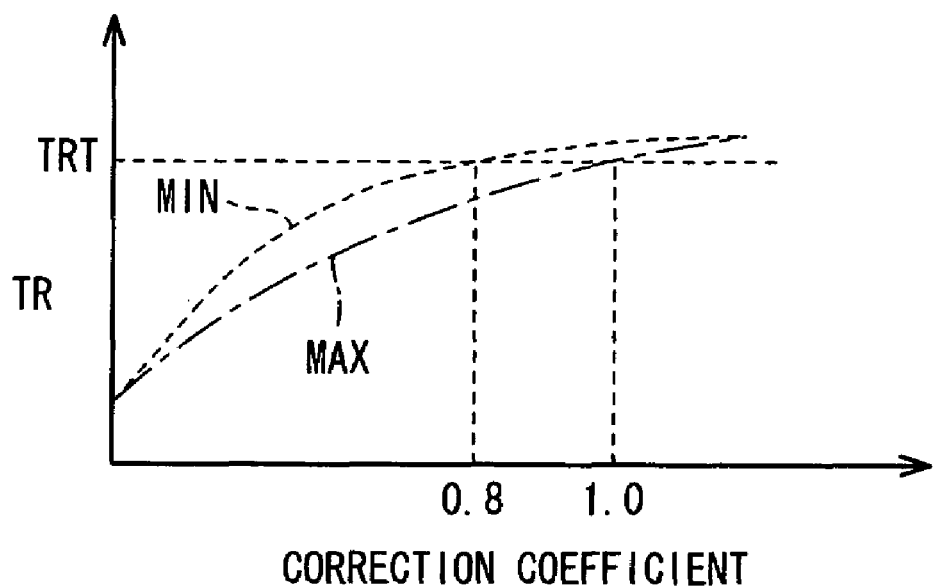
FIG. 8 is a graph showing the correction coefficient to be determined based on the operation of a passenger compartment heater that can be further used in the processing to calculate the predetermined time period in the flow chart of FIG. 3.

This will be explained with reference to FIG. 8. Where the heater-off (inoperative) temperature rise characteristic during open-state sticking is defined as MIN and the temperature rise characteristic when the heater is on (operative) at the maximum temperature setting (operator input temperature setting) is defined as MAX, the time required to reach the target temperature TRT is shorter with increasing proximity to the MIN side. It therefore suffices to define the correction coefficient for the time that the temperature rise characteristic MAX takes to reach the target temperature as 1.0 (no correction), decrease the correction coefficient with increasing proximity to the temperature rise characteristic MIN, define the value at the temperature rise characteristic MIN (i.e., the smallest value) as 0.8, for instance, and appropriately define the intermediate values.

With this arrangement, it is only necessary to detect whether the heater is on or off, so that appropriate selection of intermediate values suffices. Otherwise, the temperature set by the operator can be detected and the correction coefficient can be selected accordingly.

Figure 9:
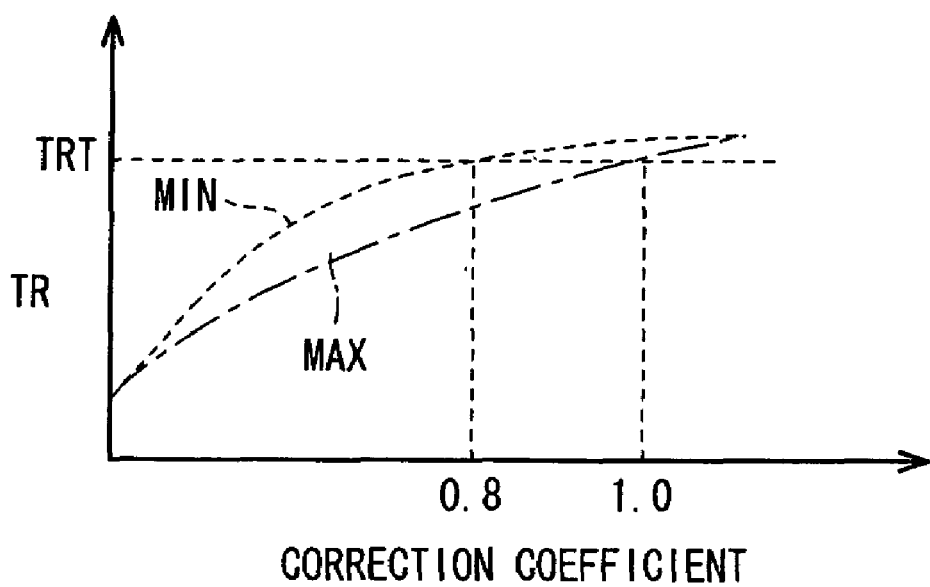
FIG. 9 is a graph showing the correction coefficient to be determined based on the operation of the passenger compartment heater that can be further used in the processing to calculate the predetermined time period in the flow chart of FIG. 3.

Similarly, with regard to heater air volume output, where, as shown in FIG. 9, the heater-off (inoperative) temperature rise characteristic during open-state sticking is defined as MIN and the temperature rise characteristic when the heater is on (operative) at the maximum blower setting is defined as MAX, it suffices to define the correction coefficient for the time that the temperature rise characteristic MAX takes to reach the target temperature as 1.0 (no correction), decrease the correction coefficient with increasing proximity to the temperature rise characteristic MIN, define the value at the temperature rise characteristic MIN (i.e., the smallest value) as 0.8, for instance, and appropriately define the intermediate values.

Though not indicated in the drawings, it is possible also to add a correction coefficient corresponding to the air conditioner operating state. Owing to the fact that the load of the air conditioner compressor is reflected in the engine load, this can be accomplished by increasing/decreasing the aforesaid engine load value in accordance with whether or not the air conditioner is operating.

Figure 3:
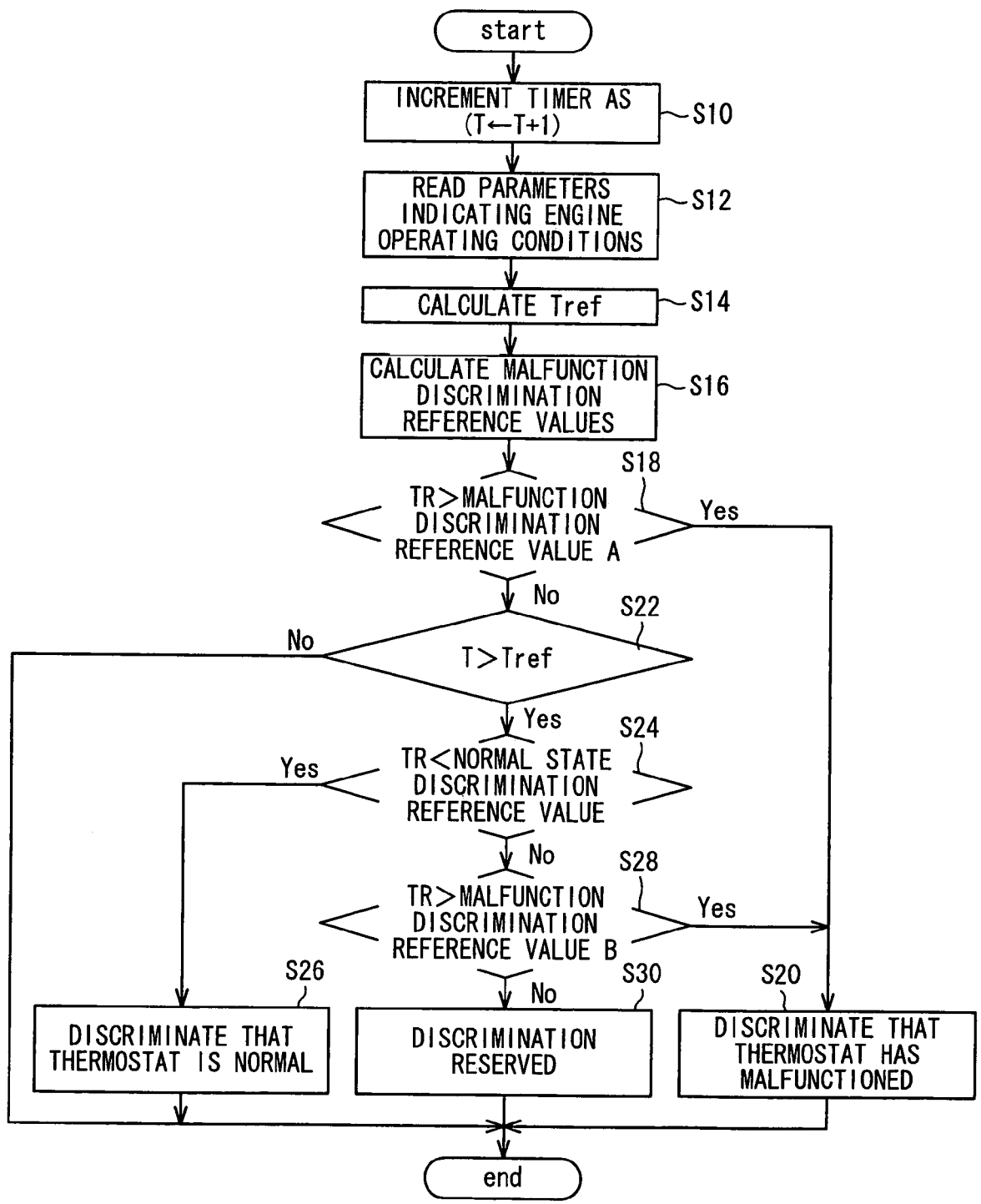
FIG. 3 is a flow chart showing the mode of operation of the malfunction detecting system of an engine cooling apparatus according to the embodiment.

The explanation of the flow chart of FIG. 3 will be continued. Next, malfunction discrimination reference values are calculated in S16. As shown in FIG. 4, three malfunction discrimination reference values are used in this embodiment: the malfunction discrimination reference value A, a malfunction discrimination reference value B and a normal state discrimination reference value. These are calculated in S16. Fixed values are used for the malfunction discrimination reference value A and the normal state discrimination reference value, while the malfunction discrimination reference value B is calculated as a value defined as a function of the initial radiator coolant temperature, i.e., the radiator coolant temperature TR at engine starting.

Next, in S18, it is checked whether the detected radiator coolant temperature TR exceeds the malfunction discrimination reference value A. When the result in S18 is Yes, it is then discriminated or judged in S20 that the cooling apparatus (radiator) 60 has malfunctioned, more specifically that the thermostat 64 has malfunctioned, still more specifically that the thermostat 64 is stuck open. Although S18 and the ensuing steps S22 to S28 involve comparison of the actually detected radiator coolant temperature TR with reference values, it is possible instead to calculate the difference between the detected radiator coolant temperature and the initial value of the radiator coolant temperature at starting of the engine 10 and compare it with the reference values.

A certain amount of time is inherently required before it becomes apparent whether the temperature rise characteristic of the radiator coolant temperature TR fits the pattern of a normal thermostat 64 or a malfunctioning thermostat 64. That is, a certain amount of time is needed to reach the malfunction discrimination enable area. In this embodiment, therefore, the predetermined time period Tref is established in order to avoid erroneous detection. However, when the radiator coolant temperature TR exceeds the malfunction discrimination reference value A, the highest of the three reference values, a determination can be made without waiting for period Tref to pass, so this determining is adopted in S118.

Next, in S22, it is checked whether the value of the timer T exceeds Tref, i.e., whether a prescribed amount of time has passed since starting of the engine 10. When the result is No, the remaining steps are skipped. When Yes, it is judged that the malfunction discrimination enable area has been reached and, next, in S24, a check is made as to whether the detected radiator coolant temperature TR is lower than the normal state discrimination reference value.

When the result in S24 is Yes, meaning that the radiator coolant temperature TR is so low as to fall below the normal state discrimination reference value, the lowest of the three reference values, it is discriminated or judged in S26 that the cooling apparatus (radiator) 60 is normal, more specifically that the thermostat 64 is normal, still more specifically that the thermostat 64 has not experienced open-state sticking.

When the result in S24 is No, it is checked in S28 whether the detected radiator coolant temperature TR exceeds the malfunction discrimination reference value B. As shown in FIG. 4, the malfunction discrimination reference value B is the middle one of the three reference values and, as such, is the basic reference value for judging malfunction. This is why the malfunction discrimination reference value B is set in accordance with the radiator coolant temperature TR at engine starting.

When the result in S28 is Yes, meaning that the radiator coolant temperature TR exceeds the basic malfunction discrimination reference value B, it is discriminated or judged in S20 that the cooling apparatus (radiator) 60 has malfunctioned, more specifically that the thermostat 64 has malfunctioned, still more specifically that the thermostat 64 has experienced open-state sticking.

When the result in S28 is No, such fact does not warrant a "normal" judgment because the radiator coolant temperature TR was found to be not lower than the normal state discrimination reference value in S24, nor does it warrant a "malfunction" judgment because the radiator coolant temperature TR was found not to exceed the malfunction discrimination reference value B in S28. Therefore, in S30, discrimination or judgment is reserved on whether a malfunction has occurred. By reserving judgment, erroneous detection can be avoided.

Since, as explained in the foregoing, in this embodiment the coolant temperature of the cooling apparatus of the engine 10, more specifically the radiator 60 thereof, is directly detected, malfunction of the thermostat 64 can be detected with improved accuracy. From this it follows that the malfunction detecting system is unaffected by external factors such as ambient temperature and therefore offers improved robustness against external factors. In addition, open-state sticking of the thermostat 64 can be detected with high accuracy because the discrimination or judgment regarding malfunction is made after determining that longer than a predetermined time period has passed after starting of the engine 10, i.e., after it becomes apparent whether the temperature rise characteristic of the radiator coolant temperature TR fits the pattern of a normal thermostat 64 or a malfunctioning thermostat 64.

Moreover, at least one of Tref (predetermined time period) and the reference values, Tref in the foregoing embodiment, is calculated based on the load of the engine 10, the vehicle speed VPS, the radiator coolant temperature TR at starting of the engine 10, and the operating state of the heater (or air conditioner), and malfunction discrimination reference value B among the reference values is calculated based on the radiator coolant temperature TR at starting of the engine 10. Owing to this configuration, the time at which the pattern of the temperature rise characteristic becomes distinguishable can be properly ascertained to enable highly accurate discrimination of open-state sticking of the thermostat 64.

Further, not only one reference value (the malfunction discrimination reference value B) but also two additional reference values (the malfunction discrimination reference value A and the normal state discrimination reference value) are defined, and when the detected radiator coolant temperature TR exceeds the highest of these three reference values (the malfunction discrimination reference value A), a discrimination or judgment that the thermostat 64 has malfunctioned is made even if the timer value T is still short of Tref. Owing to this configuration, a proportional increase in the speed of detecting malfunction of the thermostat 64 is offered on top of the foregoing advantages.

In addition, not only one reference value (the malfunction discrimination reference value B) but also two additional reference values (the malfunction discrimination reference value A and the normal state discrimination reference value) are defined, and when the detected radiator coolant temperature TR exceeds the lowest of these three reference values (the normal discrimination reference value) but does not exceed the next higher reference value (malfunction discrimination reference value B), discrimination or judgment is reserved regarding whether the thermostat 64 has malfunctioned. Owing to this configuration, the foregoing advantages are further augmented with the ability to avoid erroneous detection.

The embodiment is thus arranged to have a system for detecting malfunction of an engine cooling apparatus constituted as a radiator 60 having an inlet pipe 62 and an outlet pipe 74 each connected to an internal combustion engine 10 in such a manner that coolant flows in the radiator through the inlet pipe to be cooled and is then recirculated back to the engine through the outlet pipe, and a thermostat 64 opening/closing the inlet pipe and the outlet pipe, comprising: a temperature sensor 78 installed at the radiator and detecting a temperature of the coolant (radiator coolant temperature TR) flowing through at least one of the inlet pipe and outlet pipe, more specifically the both; malfunction discrimination area determining means (ECU 20, S10 to S14, S22) for determining whether operation of the engine since starting is within an area that enables malfunction discrimination of the cooling apparatus; and malfunction discriminating means (ECU 20, S16 to S20, S24 to S30) for discriminating whether the cooling apparatus has malfunctioned based on change of the temperature of the coolant since the engine starting, when the operation of the engine is discriminated to be within the malfunction discrimination area.

Thus, the malfunction detecting system of the engine cooling apparatus is configured to detect the temperature of the radiator coolant, discriminate whether the engine has entered the malfunction discrimination area since being started, and when is found to have entered the malfunction discrimination enable area, whether the cooling apparatus has malfunctioned is judged based on change in the detected temperature of the coolant since starting. The temperature of the coolant of the cooling apparatus of the engine, specifically its radiator, is thus directly detected and the judgment is made based thereon. Malfunction of the engine, more specifically the thermostat, can therefore be accurately detected. Owing to this configuration, the malfunction detecting system is unaffected by external factors and therefore offers improved robustness against external factors. In addition, malfunction of the engine cooling apparatus can be detected with high accuracy because the judgment regarding malfunction is made after determining that longer than the predetermined time period has passed after engine starting, i.e., after it becomes apparent whether the temperature rise characteristic of the radiator coolant temperature TR fits the pattern of a normal thermostat or a malfunctioning thermostat. It should be noted that the statement that "whether the cooling apparatus has malfunctioned is judged based on change in the detected temperature of the coolant since starting" means that malfunction of the cooling apparatus is judged based on the absolute value of the coolant temperature or its difference from a given temperature.

In the system, the malfunction discrimination area determining means includes: time measuring means (ECU 20, S10) for measuring a period of time since the engine starting (timer value T); and time comparing means (ECU 20, S22) for comparing the measured period of time with a predetermined period of time (Tref); and the operation of the engine is within the area that enables the malfunction discrimination of the cooling apparatus, when the measured period of time exceeds the predetermined period of time. Further, the malfunction discriminating means includes: temperature comparing means (ECU 20, S28) for comparing the temperature of the coolant with a reference value (malfunction discrimination reference value B); and discriminates that the cooling apparatus has malfunctioned, when the temperature of the coolant exceeds the reference value (S20).

Thus, the malfunction detecting system of the engine cooling apparatus is configured to measure time elapsed after engine starting, compare the measured elapsed time with the predetermined time period and, when the measured elapsed time exceeds the predetermined time period, judge that a malfunction discrimination area has been entered, compare the detected coolant temperature with the reference value, and judge that the cooling apparatus has malfunctioned when the detected coolant temperature exceeds the reference value. Owing to this configuration malfunction of the engine cooling apparatus can be detected with still higher accuracy.

In the system, the predetermined period of time (Tref) is calculated from at least one of a load of the engine, a speed of vehicle on which the engine is mounted, the temperature of the coolant at engine starting, operating condition of a heater of a compartment of the vehicle and operating condition of an air conditioner of the compartment of the vehicle, or the reference value is calculated from at least one of a load of the engine, a speed of vehicle on which the engine is mounted (VPS), the temperature of the coolant at engine starting, operating condition of a heater of a compartment of the vehicle and operating condition of an air conditioner of the compartment of the vehicle.

Thus, the malfunction detecting system of the engine cooling apparatus is configured to calculate one or both of the predetermined time period and the reference value based on one or more of the engine load, vehicle speed, coolant temperature at engine starting, and operating state of a heater or air conditioner. Malfunction of the engine cooling apparatus can therefore be accurately detected because the time point at which the pattern of the temperature rise characteristic becomes apparent can be appropriately ascertained.

In the system, temperature comparing means compares the temperature of the coolant with the reference value and an additional reference value (malfunction discrimination reference value A, malfunction discrimination reference value B, normal state discrimination reference value); and discriminates that the cooling apparatus has malfunctioned, if the temperature of the coolant (TR) exceeds a highest one (malfunction discrimination reference value A) of the reference values, even when the measured period of time does not exceed the predetermined period of time (ECU 20, S18, S20).

Thus, the malfunction detecting system of the engine cooling apparatus comprises one or more reference values in addition to said reference value and is configured to judge that the cooling apparatus has malfunctioned even before the elapsed time exceeds the predetermined time period when the detected coolant temperature exceeds the highest of the reference values. A proportional increase in the speed of detecting malfunction of the thermostat 64 is therefore obtained on top of the foregoing advantages.

In the system, the temperature comparing means compares the temperature of the coolant with the reference value and additional reference values (malfunction discrimination reference value A, malfunction discrimination reference value B, normal state discrimination reference value); and reserves discrimination that the cooling apparatus has malfunctioned, if the temperature of the coolant (TR) exceeds a lowest one (normal state discrimination reference value) of the reference values, but the temperature of the coolant (TR) does not exceed one (malfunction discrimination reference value B) of the reference values that is higher than the lowest one (ECU 20, S24, S28, S30).

Thus, the malfunction detecting system of the engine cooling apparatus comprises one or more reference values in addition to said reference value and is configured to reserve judgment on whether or not the cooling apparatus has malfunctioned when the detected coolant temperature exceeds the lowest of the reference values but does not exceed the second reference value higher than the lowest reference value. Owing to this configuration, the foregoing advantages are further augmented with the ability to avoid erroneous detection.

In the system, the temperature comparing means compares the temperature of the coolant with the reference value and additional reference values (malfunction discrimination reference value A, malfunction discrimination reference value B, normal state discrimination reference value); and discriminates that the cooling apparatus is normal, if the temperature of the coolant does not exceed a lowest one (normal state discrimination reference value) of the reference values. With this, an improvement in the accuracy of discriminating malfunction of the cooling apparatus is realized in addition to the foregoing advantages.

In the system, the malfunction discriminating means discriminates that thermostat 64 has experienced open-state sticking such that the cooling apparatus has malfunctioned.

The embodiment is further arranged to have a system for detecting malfunction of an engine cooling apparatus constituted as a radiator 60 having an inlet pipe 62 and an outlet pipe 74 each connected to an internal combustion engine 10 in such a manner that coolant flows in the radiator through the inlet pipe to be cooled and is then recirculated back to the engine through the outlet pipe, and a thermostat 64 opening/closing the inlet pipe and the outlet pipe, comprising: a temperature sensor 78 installed at the radiator and detecting a temperature of the coolant (TR) flowing through at least one of the inlet pipe and outlet pipe; time measuring means (ECU 20, S10) for measuring a period of time (timer T) since the engine starting; time comparing means (ECU 20, S22) for comparing the measured period of time with a predetermined value (Tref) indicative of a period of time until the thermostat presumably opens after the engine starting; temperature comparing means (ECU 20, S28) for comparing the temperature of the coolant (TR) with a reference value (malfunction discrimination reference value B), when the measured period of time exceeds the predetermined value; and malfunction discriminating means (ECU 20, S20) for discriminating that the cooling apparatus has malfunctioned, when the temperature of the coolant exceeds the reference value.

In the system, the temperature comparing means compares the temperature of the coolant with the reference value and additional reference values (malfunction discrimination reference value A, malfunction discrimination reference value B, normal state discrimination reference value); and the malfunction discriminating means discriminates that the cooling apparatus has malfunctioned, if the temperature of the coolant exceeds a highest one (malfunction discrimination reference value A) of the reference values, even when the measured period of time does not exceed the predetermined value.

In the system, temperature comparing means compares the temperature of the coolant with reference value and additional reference values (malfunction discrimination reference value A, malfunction discrimination reference value B, normal state discrimination reference value); and the malfunction discriminating means reserves discrimination that the cooling apparatus has malfunctioned, if the temperature of the coolant exceeds a lowest one (normal state discrimination reference value) of the reference values, but the temperature of the coolant does not exceed one (malfunction discrimination reference value B) of the reference values that is higher than the lowest one.

In the system, the temperature comparing means compares the temperature of the coolant with the reference value and additional reference values (malfunction discrimination reference value A, malfunction discrimination reference value B, normal state discrimination reference value); and the malfunction discriminating means discriminates that the cooling apparatus is normal, if the temperature of the coolant does not exceed the lowest one (normal state discrimination reference value) of the reference values.

It should be noted that the radiator 60 is not limited to the structure shown in FIG. 2. For example, the thermostat 64 can instead be installed on the side of the outlet pipe 72. In this case, the temperature sensor 78 is preferably installed on the side of the outlet pipe 74.

Further, although among the reference values only the malfunction discrimination reference value B is set based on the initial radiator coolant temperature TR, another parameter can be added for setting the reference value B. Similarly, the malfunction discrimination reference value A and/or the normal state discrimination reference value can be determined based on TR or some other parameter.

The entire disclosure of Japanese Patent Application No. 2003-059535 filed on Mar. 6, 2003, including specification, claims, drawings and summary, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for detecting malfunction of an engine cooling apparatus constituted as a radiator having an inlet pipe and an outlet pipe each connected to an internal combustion engine in such a manner that coolant flows in the radiator through the inlet pipe to be cooled and is then recirculated back to the engine through the outlet pipe, and a thermostat opening/closing the inlet pipe and the outlet pipe, comprising:

a temperature sensor installed at the radiator and detecting a temperature of the coolant flowing through at least one of the inlet pipe and outlet pipe;

malfunction discrimination area determining means for determining whether operation of the engine since starting is within an area that enables malfunction discrimination of the cooling apparatus; and malfunction discriminating means for discriminating whether the cooling apparatus has malfunctioned based on change of the temperature of the coolant measured by said temperature sensor since the engine starting, when the operation of the engine is discriminated to be within the malfunction discrimination area, wherein the malfunction discrimination area determining means includes:

time measuring means for measuring a period of time since the engine starting; and time comparing means for comparing the measured period of time with a predetermined period of tune calculated based on at least the temperature of the coolant at engine starting, a load of the engine, and a speed of a vehicle on which the engine is mounted;

and determines that the operation of the engine is within the malfunction discrimination area when the measured period of time exceeds the predetermined period of time.

2. A system according to claim 1, wherein malfunction discriminating means includes:

temperature comparing means for comparing the temperature of the coolant with a reference value;

and discriminates that the cooling apparatus has malfunctioned, when the temperature of the coolant exceeds the reference value.

3. A system according to claim 1, wherein the predetermined period of time is further calculated based on at least one of an operating condition of a heater of a compartment of the vehicle and an operating condition of an air conditioner of the compartment of the vehicle.

4. A system according to claim 2, wherein the reference value is calculated from at least one of a load of the engine, a speed of vehicle on which the engine is mounted, the temperature of the coolant at engine starting, operating condition of a heater of a compartment of the vehicle and operating condition of an air conditioner of the compartment of the vehicle.

5. A system for detecting malfunction of an engine cooling apparatus constituted as a radiator having an inlet pipe and an outlet pipe each connected to an internal combustion engine in such a manner that coolant flows in the radiator through the inlet pipe to be cooled and is then recirculated back to the engine through the outlet pipe, and a thermostat opening/closing the inlet pipe and the outlet pipe, comprising:

a temperature sensor installed at the radiator and detecting a temperature of the coolant flowing through at least one of the inlet pipe and outlet pipe;

malfunction discrimination area determining means for determining whether operation of the engine since starting is within an area that enables malfunction discrimination of the cooling apparatus; and malfunction discriminating means for discriminating whether the cooling apparatus has malfunctioned based on change of the temperature of the coolant since the engine starting, when the operation of the engine is discriminated to be within the malfunction discrimination area, wherein the malfunction discrimination area determining means includes:

time measuring means for measuring a period of time since the engine starting; and time comparing means for comparing the measured period of time with a predetermined period of time;

and the operation of the engine is within the area that enables the malfunction discrimination of the cooling apparatus, when the measured period of time exceeds the predetermined period of time, and wherein malfunction discriminating means includes:

temperature comparing means for comparing the temperature of the coolant with a reference value;

and discriminates that the cooling apparatus has malfunctioned, when the temperature of the coolant exceeds the reference value, and wherein the temperature comparing means compares the temperature of the coolant with the reference value and an additional reference value;

and discriminates that the cooling apparatus has malfunctioned, if the temperature of the coolant exceeds a highest one of the reference values, even when the measured period of time does not exceed the predetermined period of time.

6. A system for detecting malfunction of an engine cooling apparatus constituted as a radiator having an inlet pipe and an outlet pipe each connected to an internal combustion engine in such a manner that coolant flows in the radiator through the inlet pipe to be cooled and is then recirculated back to the engine through the outlet pipe, and a thermostat opening/closing the inlet pipe and the outlet pipe, comprising:

a temperature sensor installed at the radiator and detecting a temperature of the coolant flowing through at least one of the inlet pipe and outlet pipe;

malfunction discrimination area determining means for determining whether operation of the engine since starting is within an area that enables malfunction discrimination of the cooling apparatus; and malfunction discriminating means for discriminating whether the cooling apparatus has malfunctioned based on change of the temperature of the coolant since the engine starting, when the operation of the engine is discriminated to be within the malfunction discrimination area, wherein the malfunction discrimination area determining means includes:

time measuring means for measuring a period of time since the engine starting; and time comparing means for comparing the measured period of time with a predetermined period of time;

and the operation of the engine is within the area that enables the malfunction discrimination of the cooling apparatus, when the measured period of time exceeds the predetermined period of time, and wherein malfunction discriminating means includes:

temperature comparing means for comparing the temperature of the coolant with a reference value;

and discriminates that the cooling apparatus has malfunctioned, when the temperature of the coolant exceeds the reference value, and wherein the temperature comparing means compares the temperature of the coolant with the reference value and additional reference values;

and reserves discrimination that the cooling apparatus has malfunctioned, if the temperature of the coolant exceeds a lowest one of the reference values, but the temperature of the coolant does not exceed one of the reference values that is higher than the lower one.

7. A system for detecting malfunction of an engine cooling apparatus constituted as a radiator having an inlet pipe and an outlet pipe each connected to an internal combustion engine in such a manner that coolant flows in the radiator through the inlet pipe to be cooled and is then recirculated back to the engine through the outlet pipe, and a thermostat opening/closing the inlet pipe and the outlet pipe, comprising:

a temperature sensor installed at the radiator and detecting a temperature of the coolant flowing through at least one of the inlet pipe and outlet pipe;

malfunction discrimination area determining means for determining whether operation of the engine since starting is within an area that enables malfunction discrimination of the cooling apparatus; and malfunction discriminating means for discriminating whether the cooling apparatus has malfunctioned based on change of the temperature of the coolant since the engine starting, when the operation of the engine is discriminated to be within the malfunction discrimination area, wherein the malfunction discrimination area determining means includes:

time measuring means for measuring a period of time since the engine starting; and time comparing means for comparing the measured period of time with a predetermined period of time;

and the operation of the engine is within the area that enables the malfunction discrimination of the cooling apparatus, when the measured period of time exceeds the predetermined period of time, and wherein malfunction discriminating means includes:

temperature comparing means for comparing the temperature of the coolant with a reference value;

and discriminates that the cooling apparatus has malfunctioned, when the temperature of the coolant exceeds the reference value, and wherein the temperature comparing means compares the temperature of the coolant with the reference value and additional reference values;

and discriminates that the cooling apparatus is normal, if the temperature of the coolant does not exceed a lowest one of the reference values.

8. A system according to claim 1, wherein the malfunction discriminating means discriminates that the thermostat has experienced open-state sticking such that the cooling apparatus has malfunctioned.

9. A system for detecting malfunction of an engine cooling apparatus constituted as a radiator having an inlet pipe and an outlet pipe each connected to an internal combustion engine in such a manner that coolant flows in the radiator through the inlet pipe to be cooled and is then recirculated back to the engine through the outlet pipe, and a thermostat opening/closing the inlet pipe and the outlet pipe, comprising:

a temperature sensor installed at the radiator and detecting a temperature of the coolant flowing through at least one of the inlet pipe and outlet pipe;

time measuring means for measuring a period of time since the engine starting;

time comparing means for comparing the measured period of time with a predetermined value indicative of a period of time until the thermostat presumably opens after the engine starting calculated based on at least the temperature of the coolant at engine starting, a load of the engine, and a speed of a vehicle on which the engine is mounted;

temperature comparing means for comparing the temperature of the coolant measured by said temperature sensor with a reference value, when the measured period of time exceeds the predetermined value; and malfunction discriminating means for discriminating that the cooling apparatus has malfunctioned, when the temperature of the coolant measured by said temperature sensor exceeds the reference value.

10. A system for detecting malfunction of an engine cooling apparatus constituted as a radiator having an inlet pipe and an outlet pipe each connected to an internal combustion engine in such a manner that coolant flows in the radiator through the inlet pipe to be cooled and is then recirculated back to the engine through the outlet pipe, and a thermostat opening/closing the inlet pipe and the outlet pipe, comprising:

a temperature sensor installed at the radiator and detecting a temperature of the coolant flowing through at least one of the inlet pipe and outlet pipe;

time measuring means for measuring a period of time since the engine starting;

time comparing means for comparing the measured period of time with a predetermined value indicative of a period of time until the thermostat presumably opens after the engine starting;

temperature comparing means for comparing the temperature of the coolant with a reference value, when the measured period of time exceeds the predetermined value; and malfunction discriminating means for discriminating that the cooling apparatus has malfunctioned, when the temperature of the coolant exceeds the reference value, wherein the temperature comparing means compares the temperature of the coolant with the reference value and additional reference values;

and the malfunction discriminating means discriminates that the cooling apparatus has malfunctioned, if the temperature of the coolant exceeds a highest one of the reference values, even when the measured period of time does not exceed the predetermined value.

11. A system for detecting malfunction of an engine cooling apparatus constituted as a radiator having an inlet pipe and an outlet pipe each connected to an internal combustion engine in such a manner that coolant flows in the radiator through the inlet pipe to be cooled and is then recirculated back to the engine through the outlet pipe, and a thermostat opening/closing the inlet pipe and the outlet pipe, comprising:

a temperature sensor installed at the radiator and detecting a temperature of the coolant flowing through at least one of the inlet pipe and outlet pipe;

time measuring means for measuring a period of time since the engine starting;

time comparing means for comparing the measured period of time with a predetermined value indicative of a period of time until the thermostat presumably opens after the engine starting;

temperature comparing means for comparing the temperature of the coolant with a reference value, when the measured period of time exceeds the predetermined value; and malfunction discriminating means for discriminating that the cooling apparatus has malfunctioned, when the temperature of the coolant exceeds the reference value, wherein the temperature comparing means compares the temperature of the coolant with the reference value and additional reference values;

and the malfunction discriminating means reserves discrimination that the cooling apparatus has malfunctioned, if the temperature of the coolant exceeds a lowest one of the reference values, but the temperature of the coolant does not exceed one of the reference values that is higher than the lowest one.

12. A system according to claim 11, wherein the temperature comparing means compares the temperature of the coolant with the reference value and additional reference values;

and the malfunction discriminating means discriminates that the cooling apparatus is normal, if the temperature of the coolant does not exceed the lowest one of the reference values.

13. A system according to claim 9, wherein the malfunction discriminating means discriminates that the thermostat has experienced open-state sticking such that the cooling apparatus has malfunctioned.

* * * * *